US011536192B2

(12) United States Patent
Daniels et al.

(10) Patent No.: US 11,536,192 B2
(45) Date of Patent: Dec. 27, 2022

(54) ROTARY TURBINE BYPASS VALVE

(71) Applicant: Cummins Ltd, London (GB)

(72) Inventors: Robin Daniels, Huddersfield (GB);
Gareth Williamson, Huddersfield (GB);
Ross Deacon, Huddersfield (GB); Laith Al-Kazaz, Huddersfield (GB); Thomas Morton, Huddersfield (GB);
Christopher Parry, Huddersfield (GB);
Richard Goodyear, Huddersfield (GB);
Mark R. Holden, Huddersfield (GB);
Jon-Luke Keating, Huddersfield (GB);
Waqas Ali, Huddersfield (GB); John Bywater, Huddersfield (GB); Thomas Roberts, Huddersfield (GB)

(73) Assignee: CUMMINS LTD., London (GB)

( * ) Notice: Subject to any disclaimer, the term of this patent is extended or adjusted under 35 U.S.C. 154(b) by 306 days.

(21) Appl. No.: 16/639,869

(22) PCT Filed: Aug. 22, 2018

(86) PCT No.: PCT/GB2018/052382
§ 371 (c)(1),
(2) Date: Feb. 18, 2020

(87) PCT Pub. No.: WO2019/038540
PCT Pub. Date: Feb. 28, 2019

(65) Prior Publication Data
US 2020/0362752 A1 Nov. 19, 2020

(30) Foreign Application Priority Data
Aug. 22, 2017 (GB) ...................................... 1713435

(51) Int. Cl.
*F02B 37/18* (2006.01)
*F16K 5/18* (2006.01)
*F16K 11/085* (2006.01)

(52) U.S. Cl.
CPC ............ *F02B 37/183* (2013.01); *F16K 5/184* (2013.01); *F16K 11/085* (2013.01); *F16K 11/0853* (2013.01)

(58) Field of Classification Search
CPC ...... F02B 37/183; F16K 5/184; F16K 11/085; F16K 11/0853
See application file for complete search history.

(56) References Cited

U.S. PATENT DOCUMENTS

| 4,224,794 A | 9/1980 | Woolenweber |
| 2005/0086936 A1 | 4/2005 | Bucknell et al. |
(Continued)

FOREIGN PATENT DOCUMENTS

| CN | 87103337 A | 3/1988 | |
| DE | 102011107413 A1 * | 1/2013 | ............ F02B 37/183 |
(Continued)

OTHER PUBLICATIONS

International Search Report and Written Opinion issued by the European Patent Office, dated Jan. 11, 2019, for International Application No. PCT/GB2018/052382; 16 pages.
(Continued)

*Primary Examiner* — Audrey B. Walter
(74) *Attorney, Agent, or Firm* — Faegre, Drinker, Biddle & Reath LLP

(57) ABSTRACT

A rotary turbine bypass valve comprises a valve chamber positioned at a junction of an inlet port, an outlet port and a bypass port, the inlet port configured for fluid communication with a flow of exhaust gas from an engine, the outlet port configured for fluid communication with an inlet of a turbine, and the bypass port configured for fluid communication with an exhaust aftertreatment device; and a valve rotor supported for rotation, about a valve axis, within the valve chamber. The valve rotor is rotatable about the valve axis between a first position in which the valve rotor permits gas flow through the bypass port and a second position in which the valve rotor blocks gas flow through the bypass port. The valve rotor is eccentric such that it includes a seal portion which is a portion of the valve rotor within the valve chamber which is furthest radially spaced from the valve axis; and as the valve rotor moves from the first position to the second position the seal portion moves towards the
(Continued)

bypass port such that the radial separation between the valve rotor and the bypass port decreases to a minimum when the valve rotor is in the second position in which the seal portion is adjacent the bypass port.

11 Claims, 8 Drawing Sheets

(56) References Cited

U.S. PATENT DOCUMENTS

| | | | | |
|---|---|---|---|---|
| 2008/0315143 A1* | 12/2008 | Mendoza | ............... | F16K 25/005 251/305 |
| 2014/0144134 A1* | 5/2014 | McEwan | ............... | F02B 37/013 60/602 |
| 2015/0337717 A1* | 11/2015 | Robinson | ............... | F02D 9/06 417/245 |

FOREIGN PATENT DOCUMENTS

| | | |
|---|---|---|
| DE | 102011107413 A1 | 1/2013 |
| FR | 2483515 A1 | 12/1981 |
| NL | 1017023 C | 7/2002 |
| WO | 2009030914 A2 | 3/2009 |
| WO | 2016126237 A1 | 8/2016 |

OTHER PUBLICATIONS

Search Report issued by the United Kingdom Intellectual Property Office dated Jan. 26, 2018 for Application No. GB1713435.4; 4 pages.

International Preliminary Report on Patentability received for PCT Patent Application No. PCT/GB2018/052382, dated Mar. 5, 2020, 11 pages.

* cited by examiner

ROTARY TURBINE BYPASS VALVE

CROSS-REFERENCE TO RELATED APPLICATIONS

The present application is a National State Application under 35 U.S.C. § 371 of PCT Application No. PCT/GB2018/052382, filed Aug. 22, 2018, which claims priority to U.K. Application No. 1713435.4, filed Aug. 22, 2017, the entire disclosures of which being hereby expressly incorporated herein by reference.

FIELD OF THE DISCLOSURE

The present disclosure relates to a valve. In particular, the valve may be a turbine bypass valve suitable for bypassing the inlet to a turbine.

BACKGROUND

Turbines are well known devices for converting the kinetic energy within a flowing gas into useful work. In particular, known turbines convert the kinetic energy of flowing gas into rotation of a rotor (or turbine wheel) of the turbine. The rotation of the rotor may be transmitted by a suitable linkage to any device suitable for doing useful work. Examples of such device include a power generator (such that the turbine forms part of a power turbine) and a compressor (such that the turbine forms part of a turbocharger).

As is well known in the art, turbochargers function by their turbine receiving exhaust gas from an internal combustion engine and consequently rotating a turbine wheel of the turbocharger so as to drive rotation of a compressor wheel. The compressor wheel draws in gas and pressurises it so that the gas output by the compressor is at an elevated pressure (or boost pressure) as compared to that at the inlet of the compressor. The output of the compressor of the turbocharger (i.e. the gas at boost pressure) can be fed to an inlet of the internal combustion engine of which the turbocharger forms part.

In some applications of turbine, a turbine bypass valve may be required to enable exhaust gas produced by the engine to which the turbine is attached to bypass the turbine so it flows to an exhaust aftertreatment system of the engine without passing through the turbine.

Known turbine bypass valves can be difficult to manufacture to the required tolerances and therefore expensive.

One known type of turbine bypass valve is a rotary valve. A rotary valve includes a housing defining a valve chamber positioned at a junction of an inlet port, an outlet port and a bypass port. A valve rotor is supported for rotation in the valve chamber. The valve rotor is rotatable about a valve axis between a first position in which the valve rotor permits gas flow through the bypass port and a second position in which the valve rotor blocks gas flow through the bypass port.

Known rotary valves can suffer from leakage problems, whereby gas leaks past the valve rotor to the bypass port, thereby reducing the amount of gas which reaches the turbine and hence reducing the performance of the system.

In addition, some known rotary valves suffer from sticking, whereby the valve rotor contacts the housing, particularly when the valve rotor is in the second position. The fact that the valve rotor contacts the housing means that, in extreme cases, particularly under the influence of heat, the valve rotor may jam. In less extreme cases the valve rotor may foul against the housing. This may lead to excessive wear of the valve (and, hence, potentially sealing issues) and/or additional load placed on the actuator used to actuate the valve rotor. Such additional load may lead to premature failure of the actuator and/or failure of the actuator to control the valve rotor correctly.

There exists a need to provide an alternative turbine bypass valve which overcomes one or more of the disadvantages of known bypass valves whether set out above or otherwise. Additionally, there is a need for an alternative turbine bypass valve.

SUMMARY

According to a first aspect of the present disclosure, there is provided a rotary turbine bypass valve comprising: a valve chamber positioned at a junction of an inlet port, an outlet port and a bypass port, the inlet port configured for fluid communication with a flow of exhaust gas from an engine, the outlet port configured for fluid communication with an inlet of a turbine, and the bypass port configured for fluid communication with an exhaust aftertreatment device; and a valve rotor supported for rotation, about a valve axis, within the valve chamber; wherein the valve rotor is rotatable about the valve axis between a first position in which the valve rotor permits gas flow through the bypass port and a second position in which the valve rotor blocks gas flow through the bypass port; and wherein the valve rotor is eccentric such that it includes a seal portion which is a portion of the valve rotor within the valve chamber which is furthest radially spaced from the valve axis; and as the valve rotor moves from the first position to the second position the seal portion moves towards the bypass port such that the radial separation between the valve rotor and the bypass port decreases to a minimum when the valve rotor is in the second position in which the seal portion is adjacent the bypass port.

The valve chamber may be defined by a housing. The valve rotor may comprise at least one spindle. The or each spindle may be supported by the housing such that the or each spindle lies along the valve axis, and such that the valve rotor is rotatable relative to the housing about the or each spindle.

The seal portion may comprise a rotor seal feature sized and shaped to co-operate with the bypass port to plug the bypass port when the valve rotor is in the second position.

The rotor seal feature comprises a raised sealing face which has a shape corresponding to that of an opening of the bypass port, the sealing face being received by the bypass port when the valve rotor is in the second position.

The valve rotor may comprise a recess, said recess defining at least a portion of a flow passage between the inlet port and outlet port when the valve rotor is in the second position.

A portion of a wall defining the valve chamber may include an abradable material, such that, when the valve rotor is in the second position, the valve rotor contacts the abradable material to form a seal therewith.

The abradable material may be located adjacent the bypass port.

The abradable material may be located between the bypass port and the outlet port.

The valve rotor may comprise an abradable material which contacts a wall of the valve chamber when the valve rotor is in the second position.

The seal portion of the valve rotor may comprise said abradable material of the valve rotor.

The valve rotor may comprise two separate regions of abradable material, a first region of abradable material located on a first side of the bypass port when the valve rotor is in the second position, and a second region located on a second side of the bypass port when the valve rotor is in the second position.

According to a second aspect of the disclosure there is provided a rotary turbine bypass valve comprising: a valve chamber positioned at a junction of an inlet port, an outlet port and a bypass port, the inlet port configured for fluid communication with a flow of exhaust gas from an engine, the outlet port configured for fluid communication with an inlet of a turbine, and the bypass port configured for fluid communication with an exhaust aftertreatment device; and a valve rotor supported for rotation, about a valve axis, within the valve chamber; wherein the valve rotor is rotatable about the valve axis between a first position in which the valve rotor permits gas flow through the bypass port and a second position in which the valve rotor blocks gas flow through the bypass port; and wherein the valve rotor comprises a first portion within the valve chamber which defines at least part of a flow passage between the inlet port and the outlet port when the rotor is in the second position; and wherein a second portion of the valve rotor, within the valve chamber, separate to the first portion, comprises a recess or cutaway.

When the valve rotor is in the second position, the valve rotor and the bypass port may define a bypass chamber. The recess or cutaway may be located in the bypass chamber.

The valve rotor may comprise a second recess. Said second recess may define at least a portion of a flow passage between the inlet port and outlet port when the valve rotor is in the second position.

The turbine may forms part of a turbocharger.

According to a third aspect of the disclosure there is provided an engine arrangement comprising an engine, a turbine and a valve according to either of the previous aspects.

BRIEF DESCRIPTION OF THE DRAWINGS

It will be appreciated that it is within the scope of the disclosure for optional features of one aspect of the disclosure to be combined, where appropriate, with features of another aspect of the disclosure.

The disclosure will now by described by way of example, with reference to the accompanying figures in which.

DETAILED DESCRIPTION OF EMBODIMENTS OF THE DISCLOSURE

Figure 1:
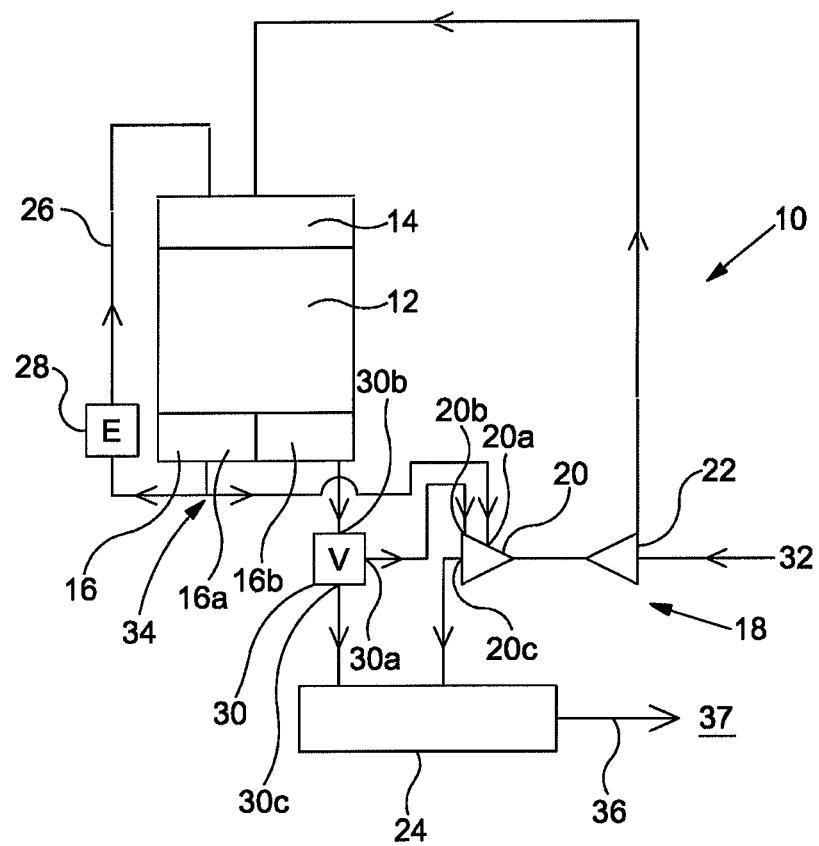
FIG. 1 shows a schematic view of a known engine arrangement of which a valve according to an embodiment of the present disclosure may form part.

FIG. 1 shows a schematic view of a known engine arrangement 10. The engine arrangement includes a plurality of combustion chambers 12 which are connected to an inlet manifold 14 and an outlet manifold 16. The outlet manifold 16 is separated into a first portion 16a and a second portion 16b. The first portion 16a of the outlet manifold is connected to a first set (not shown) of the combustion chambers 12, and the second portion 16b of the outlet manifold 16 is connected to a second set (again, not shown) of the combustion chambers 12.

The engine arrangement also comprises a turbocharger 18 having, as is well known, a turbine 20 and a compressor 22. The engine arrangement further includes an exhaust after treatment system 24, an EGR circuit 26, which includes an EGR valve 28, and a turbine bypass valve 30.

In use, the combustion chambers 12 are supplied with fuel and air, the air being provided from the atmosphere 37 via the engine air inlet 32, the air passing through the compressor 22 of the turbocharger 18 and inlet manifold 14. Once the fuel and air has been burnt in the combustion chambers 12, exhaust gas is produced which passes to the outlet manifold 16. The exhaust gas from the first portion 16a of the exhaust manifold 16 is supplied to a T-junction 34 at which it is split so that it flows both to an EGR (exhaust gas recirculation) circuit 26 and to a first inlet 20a of the turbine 20 of the turbocharger 18. The EGR circuit 26 passes back to the inlet manifold 14 and the amount of exhaust gas which passes into the EGR circuit 26 is controlled by the EGR valve 28. The manner in which the EGR circuit functions is entirely conventional and is not key to the present disclosure. Consequently, for the sake of brevity, further discussion as to the operation of the EGR circuit is omitted.

The turbine 20 of the turbocharger 18 is a twin inlet (or twin volute) turbine. As such, the turbine includes a second inlet 20b. This inlet 20b of the turbine 20 is supplied by a first outlet 30a of the bypass valve 30. The bypass valve 30 is in turn supplied with exhaust gas from the second portion 16b of the exhaust manifold 16 via an inlet 30b of the bypass valve 30.

The exhaust gas provided to the turbine 20 of the turbocharger 18 via the inlets 20a, 20b causes a turbine wheel (not shown) of the turbine 20 to rotate. The exhaust gas then exits the turbine 20 via the turbine outlet 20c and passes to an exhaust after-treatment system 24 (e.g. a particulate trap and/or selective catalytic reduction arrangement). The exhaust gas then exits the after-treatment system 24 via an engine outlet 36 to atmosphere 37. The rotation of the turbine wheel of the turbine caused by the exhaust gases provided to the turbine 20 causes rotation of a compressor wheel (again, not shown) of the compressor 18. Rotation of the compressor wheel results in air at atmospheric pressure drawn in to the compressor through the engine inlet 32 to be pressurised to an elevated (or boost) pressure by the compressor wheel. This pressurised gas is then supplied to the inlet manifold 14 as previously discussed.

The bypass valve 30 also includes a second outlet 30c (or bypass outlet) which is connected to the after-treatment system 24 (without going through the turbine).

The bypass valve 30 can be controlled so that it is possible to selectively open the second outlet 30c. When the second outlet 30c is open, at least some of the exhaust gas from the second portion 16b of the outlet manifold 16 which would have otherwise passed to the inlet 20b of the turbine 20 can flow via the outlet 30c to the after-treatment system 24. Such gas is said to bypass the turbine 20. The ability for gas to bypass the turbine 20 may be advantageous in several situations. First, in a situation where it is desired to reduce the speed of the turbine, for example when the turbine 20 is over-speeding, the ability to bypass the turbine, and thereby reduce the amount of exhaust gas being supplied to the turbine will reduce the amount of exhaust gas rotating the turbine wheel and hence reduce the speed of the turbine wheel. Secondly, in some applications, the after-treatment system 24 may only function effectively when it is at a required operating temperature. This may be the case when, for example, the after-treatment system 24 includes a temperature-sensitive catalyst. The required operating temperature of the after-treatment system 24 may be considerably in excess of room temperature. Consequently, at some point during the operation of the engine arrangement 10 (for example, just after engine switch on) the after-treatment system 24 may be operating at a temperature below the required operating temperature. In this situation, the bypass valve 30 can be opened such that some of the hot exhaust gas which would otherwise pass to the turbine 20, passes to the after-treatment system 24 without passing through the turbine 20, thereby causing the temperature of the after-treatment system 24 to be raised relatively quickly so that it can reach its operating temperature.

Once it is no longer desired to allow some of the exhaust gas from the second portion 16b of the exhaust manifold 16 to bypass the turbine 20, the bypass valve 30 can be actuated so as to close it, thereby closing the second outlet 30c and ensuring that all of the exhaust gas passing into the bypass valve 30 from the second portion 16b of the exhaust manifold 16 passes to the turbine 20 of the turbocharger 18.

The engine arrangement 10 described above provides context as to the operation of a turbine bypass valve. It will be appreciated that a bypass valve according to the present disclosure may be utilised as part of any appropriate engine arrangement. For example, the engine arrangement discussed above includes a two-part exhaust manifold arrangement. Some suitable arrangements may instead include a single exhaust manifold with the valve being located between the exhaust manifold and the turbine inlet. In addition, although the disclosure is described in relation to a turbine which forms part of a turbocharger, the disclosure equally applies to any type of turbine, for example, but not limited to, a turbine that forms part of a power turbine. The turbine may include a twin inlet or twin volute as discussed above. Alternatively, the turbine may include any appropriate number of inlets and/or volutes, such as a single inlet and a single volute.

The specific structural details of a bypass valve according to the present disclosure are now discussed in more detail below.

Figure 2:
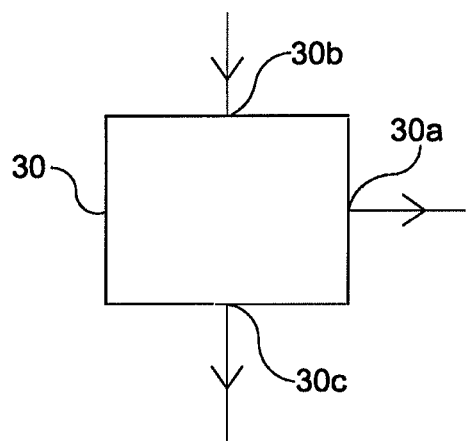
FIG. 2 shows an enlarged schematic view of a valve according to an embodiment of the present disclosure.

FIG. 2 shows an enlarged schematic view of the valve 30. Features of this figure which correspond to those of FIG. 1 have been given the same reference numerals.

Figure 3:
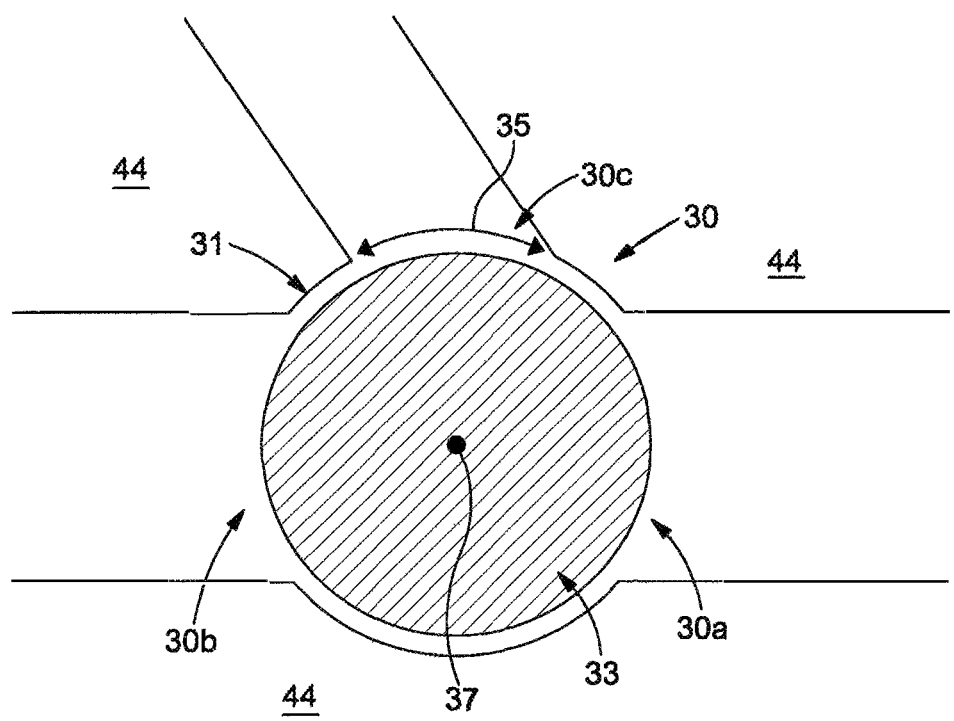
FIG. 3 shows a schematic cross-section of a known rotary bypass valve.

FIG. 3 shows a known type of rotary turbine bypass valve. The valve 30 comprises a valve chamber 31 positioned at a junction of an inlet port 30b, an outlet port 30a and a bypass port 30c. The inlet port is configured for fluid communication with a flow of exhaust gas from an engine, the outlet port is configured for fluid communication with an inlet of a turbine (for example the turbine of a turbocharger), and the bypass port 30c is configured for fluid communication with an exhaust after-treatment device. The bypass valve 30 also includes a valve rotor 33 which is supported for rotation about a valve axis 37 within the valve chamber 31. The valve chamber 31 may be defined by a housing 44. Although not shown in FIG. 3, the valve rotor 33 is rotatable in the directions indicated by 35 about the valve axis 37 between a first position in which the valve rotor 33 permits gas flow through the bypass port 30c and a second position in which the valve rotor 33 blocks gas flow through the bypass port 30c. It can be seen that the valve rotor 33 is mounted so that it is concentric with the valve axis 37.

In the present embodiment the housing 44 is a component which is distinct from other components of the engine arrangement of which the valve forms part. In other embodiments the housing may be part of another component of the engine arrangement. For example, the housing may be formed by a portion of the exhaust manifold, the exhaust pipework or the turbine housing.

Figure 4:
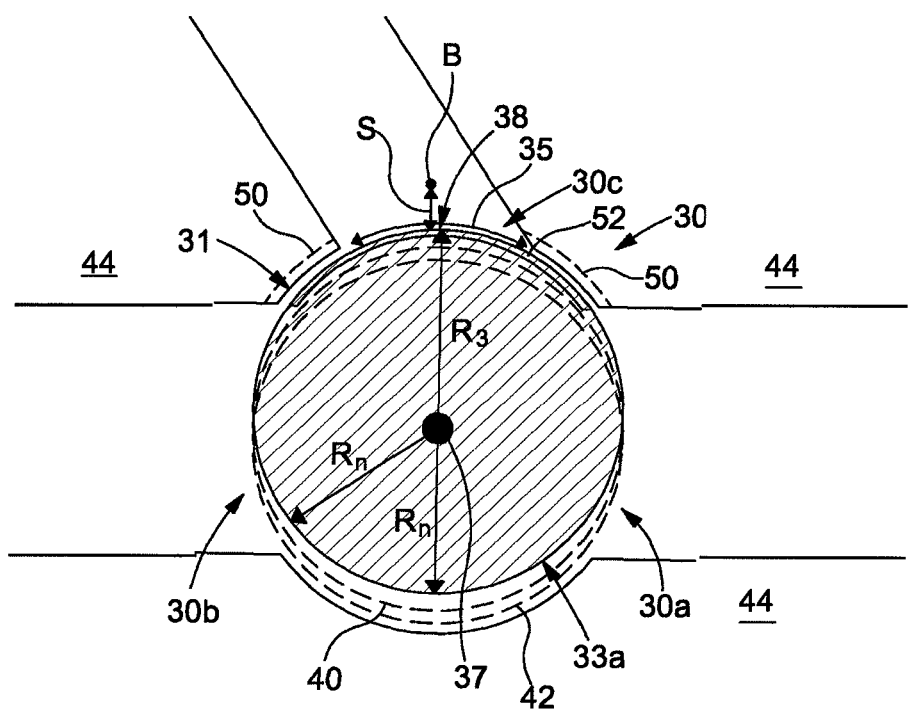
FIG. 4 shows a schematic cross-section of a rotary bypass valve according to an embodiment of the disclosure.

FIG. 4 shows a schematic view of an embodiment of the present disclosure. All of the features shown within FIG. 4, which are equivalent to those of the valve shown in FIG. 3, have been given the same reference numerals. The differences between the embodiment of FIG. 4 and the valve shown in FIG. 3 are now discussed.

The valve rotor 33a according to this embodiment of the present disclosure is eccentric. That is to say, the valve rotor 33a is not mounted so that it is concentric with the valve axis 37. In particular, the valve rotor includes a seal portion 38 which is a portion of the valve rotor 33a located within the valve chamber 31 which is the furthest radially spaced from the valve axis 37. That is to say, the radial distance $R_S$ between the valve axis 37 and seal portion 38 is greater than the radial distance (for example, those indicated by $R_N$) between the valve axis 37 and any other portion of the valve rotor (i.e. any portion other than the seal portion) located within the valve chamber 31. For ease of reference, FIG. 4 also shows in dashed line the relative positioning of the valve rotor 33 of the known valve shown in FIG. 3. This dashed line is indicated by the reference numeral 40.

The view of the valve shown in FIG. 4 shows the valve rotor 33a in the second position in which the valve rotor 33a blocks gas flow through the bypass port 30c. If the valve is rotated in either of the directions indicated by 35 about the valve axis 37 by 180 degrees then the valve rotor 33a will be located in a first position in which the valve rotor permits gas flow through the bypass port 30c. The position of the valve rotor 33a in this situation is indicated by the dashed lines 42. It should be noted that the first position of the rotor 33a shown in FIG. 4 and indicated by the dashed lines 42 is merely an example of one of many first positions of the valve rotor 33a. Any position of the valve rotor 33a in which the valve rotor permits gas flow through the bypass port 30c may be referred to as a first position of the valve rotor 33a.

As the valve rotor 33a moves from the first position (as indicated by 42) to the second position (as shown in solid line within FIG. 4) the seal portion 38 moves towards the bypass port 30c such that the radial separation S between the valve rotor 33a and the bypass port 30c decreases to a minimum when the valve rotor 33a is in the second position in which the seal portion 38 is adjacent the bypass port 30c.

Within FIG. 4 the radial separation S between the valve rotor 33a and bypass port 30c is indicated schematically by the distance between the valve rotor 33a in a radial direction (relative to the axis 37) and an arbitrary point B chosen within the bypass port 30c. It will be appreciated that such radial separation may be determined in any appropriate manner. For example, the radial separation may be the distance in a radial direction between a radially outer surface of the valve rotor and an imaginary surface which extends between the walls of the bypass port 30c and constitutes an interface between the valve chamber 31 and the bypass port 30c. In another example the radial separation between the valve rotor 33a and the bypass port may be determined as a radial distance between an outer surface of the valve rotor 33a and an imaginary surface located within the bypass port 30c which is defined by the maximum radial extent of the valve rotor as it completes a full rotation at the valve axis 37. In this case, the separation between the valve rotor and the bypass port will decrease to zero when the valve rotor is in the second position.

As compared to known rotary turbine bypass valves (such as that shown in FIG. 3) in which the valve rotor 33 is concentric with the valve axis 37 such that the radial separation between the valve rotor and bypass port 30c is generally constant, the radial separation between the valve rotor of the present disclosure and the bypass port decreases to a minimum when the valve rotor is in the second position. Reducing the separation between the valve rotor and the bypass port 30c will increase the sealing between the valve rotor and the bypass port when the valve rotor is in the second position. This means that the likelihood of gas leaking via the bypass port when it should be passing to the inlet the turbine is reduced. This results in a corresponding improvement in the performance of the turbine (and hence engine arrangements of which the bypass may form part).

In addition, the corollary to the radial separation between the valve rotor and bypass port decreasing to a minimum as the valve rotor moves from the first position to the second position, is that as the valve motor moves from the second position to the first position, the radial separation between the valve rotor and the bypass port will increase. This increase in separation is not of concern when the valve rotor is not in the second position, as it is only in the second position that the valve rotor has to seal the bypass port. Furthermore, the fact that the separation between the valve rotor and the bypass port increases means that the valve rotor will not contact the bypass port (or wall defining the valve chamber adjacent the bypass port) when the valve rotor is not in the second position. This has the benefit of reduced contact between the valve rotor and the walls defining the valve chamber which will reduce wear on the valve rotor and/or walls of the valve chamber, thereby increasing the operating lifetime of these components. In addition, reduced contact between the walls of the valve chamber will result in less work being required in order to rotate the valve rotor. This may reduce the load and hence wear on any actuator which drives rotation of the valve rotor. This may mean that a smaller, lighter, less powerful and/or cheaper actuator may be used. In addition, the fact that the separation between the valve rotor and the bypass port increases means that the likelihood of the valve rotor sticking or jamming against the wall of the valve chamber is reduced.

In the embodiment discussed above the valve rotor is said to be eccentric. It is the eccentricity of the valve rotor that enables the radial separation S between the valve rotor and the bypass port to decrease to a minimum when the valve rotor is in the second position in which the seal portion is adjacent the bypass port. In order for such eccentricity to be achieved, the axis of rotation of the valve rotor is not concentric with the valve axis.

In some embodiments the valve chamber may be defined as a generally cylindrical bore. In such embodiments the valve axis and the central axis of the cylindrical valve chamber may be one and the same.

Provided the axis of rotation of the valve rotor is not concentric with the valve axis the rotor of an embodiment of the disclosure may have any appropriate shape. For example, the profile of the rotor in the plane perpendicular to the axis of rotation of the rotor may be generally circular, may itself be eccentric relative to the axis of rotation of the rotor or may have one or more lobes.

In alternative embodiments the valve chamber may be defined as a bore which has a non-rotationally symmetric profile in the plane perpendicular to the valve axis. For example, the profile of the valve chamber in the plane perpendicular to the valve axis may be generally elliptical or may have one or more lobes. In embodiments for which the profile of the valve chamber in the plane perpendicular to the valve axis has one or more lobes, the lobes may be positioned so that they correspond to the position of one or more of the inlet port, outlet port and bypass port. In the presently discussed embodiments the valve axis will not be concentric with a central axis of the valve chamber. As before, the rotor of such an embodiment of the disclosure may have any appropriate shape. For example, the profile of the rotor in the plane perpendicular to the axis of rotation of the rotor may be generally circular, may itself be eccentric relative to the axis of rotation of the rotor or may have one or more lobes. In some embodiments the profile of the rotor in the plane perpendicular to the axis of rotation of the rotor may correspond to the profile of the valve chamber in the plane perpendicular to the valve axis, although they may be of different sizes.

It will be appreciated that for all of the examples discussed above the valve rotor is eccentric within the meaning of the present disclosure.

Figure 5:
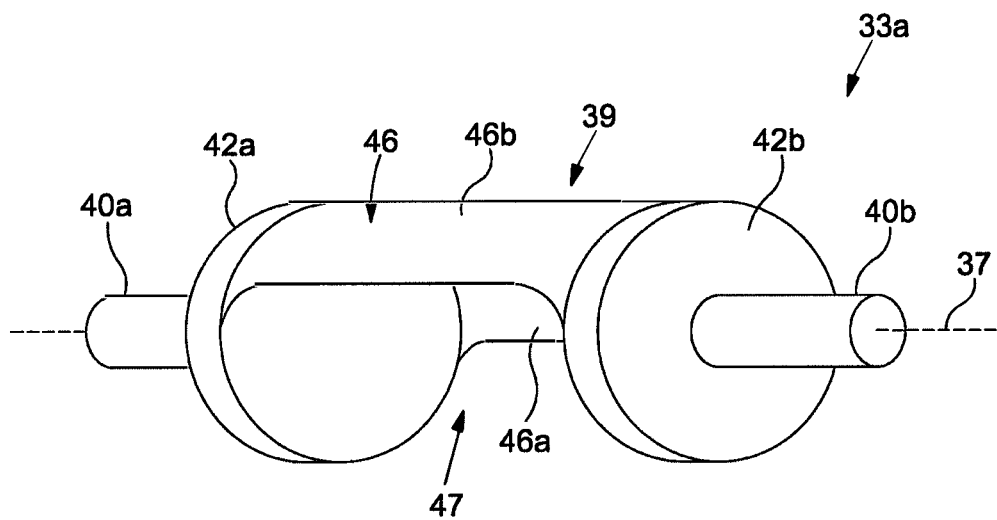
FIGS. 5 and 6 show schematic views of a valve rotor of the bypass valve shown in FIG. 4.
Figure 6:
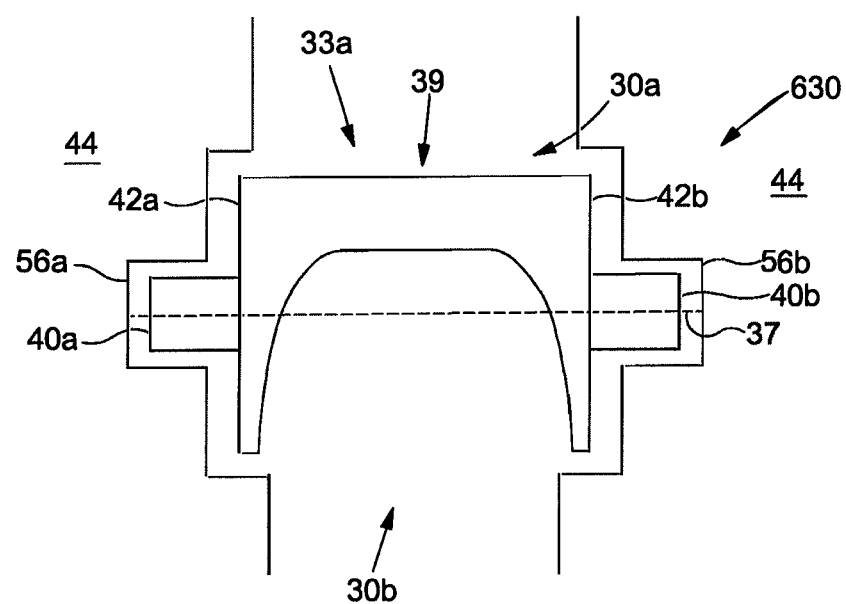

FIGS. 5 and 6 show more detailed views of the valve rotor 33a. In particular, FIG. 5 shows a schematic view of the valve rotor 33a of the valve 30. The valve rotor 33a comprises a main body 39 and spindles 40a, 40b extending therefrom. Also indicated is the axis of rotation 37 about which the valve rotor 33a rotates. As previously discussed, the valve rotor 33a is eccentric (although this cannot be seen clearly in FIG. 5). Although the present embodiment includes two spindles it will be appreciated that, in another embodiment, the valve rotor may only include a single spindle. In both cases, the or each spindle is supported, as best seen in FIG. 6, by the housing 44 such that the or each spindle 40a, 40b lies along the valve axis 37 and such that the valve rotor is rotatable relative to the housing 44 about the or each spindle 40a, 40b. In more detail, the valve rotor 33a comprises end walls 42a and 42b. These end walls 42a, 42b are axially separated from one another and may therefore be referred to as axially offset end walls. The axially offset end walls 42a, 42b define not only the outermost axial edge of the main body 39 of the valve rotor 33a, but also the radially outermost edge of the valve rotor 33a. When positioned in the valve chamber 31, the axially offset end walls 42a, 42b are received within the valve chamber 31. Spindles 40a and 40b extend axially outwards from a respective one of the axially offset end walls 42a, 42b. The spindles 40a, 40b are generally cylindrical and provide an axle about which the valve rotor 33a rotates. The spindles 40a, 40b are received by two bores 56a, 56b of the valve chamber 31. In some embodiments the bores 56a, 56b may include bosses, bearings or the like to facilitate relative rotation between the housing 44 and valve rotor 33a. It will be appreciated that in other embodiments the one or more spindles and valve chamber may have any appropriate geometry other than that shown provided that the valve rotor is supported by the housing so as to be able to rotate relative thereto.

Positioned between the end walls 42a, 42b, is a sealing section 46. The sealing section 46 and seal portion 38 may be one and the same. Alternatively, the sealing section 46 may include the seal portion 38. The sealing section 46 comprises an internal surface 46a and external surface 46b. The sealing section 46 (in particular the internal surface 46a thereof) and end walls 42a, 42b define a cavity 47 therebetween.

As previously discussed, when the valve rotor 33a is located within the valve chamber 31, the rotational position of the valve rotor 33a dictates whether the exhaust gas flow is permitted through or blocked from passing through the bypass port 30c. When the valve rotor 33a is in the second, bypass port blocking position, the valve rotor is in a rotational position such that the external surface 46b of the sealing section 46 covers or substantially covers, bypass port 30c. Exhaust gas flow is thereby substantially prevented from flowing through the bypass port 30c. When the valve rotor 33a is not in the second, bypass port blocking position, the valve rotor 33a may be said to be in a first position which is a rotational position in which the relative alignment of the external surface 46b of the sealing section 46 and bypass port 30c permits passage of exhaust gas flow through the bypass port 30c. That is to say, exhaust gas is able to flow into the bypass port 30c via the cavity 47 of the valve rotor 33a. Depending on the geometry of the valve rotor 33a, when the valve rotor 33a is not in the bypass port blocking position (i.e. is in the first position), the internal surface 46a of the ceiling section 46 may be shaped and positioned so as to either obstruct flow of the exhaust gas through the valve or deflect flow towards either the bypass port 30c or outlet port 30a. That is to say, in certain positions of the valve rotor 33a, and with certain valve rotor geometries, the internal surface 46a may act as a deflector plate for the exhaust gas flow.

The cavity 47 may also be referred to as a recess. It would be appreciated that when the valve rotor 33a is in the second position (i.e. the position in which the bypass port is blocked) the recess 47 will define at least a portion of a flow passage between the port 30b and outlet port 30a.

The valve rotor 33a and housing 44 may be made of any appropriate material to withstand the high temperatures of the exhaust gas supplied to the valve, produced by the engine of an engine arrangement of which the bypass valve forms part. For example, the valve rotor and housing may be made from a suitable metal.

An actuator, not shown, is mounted to the valve rotor 33a via one of the spindles 40a, 40b. The actuator can be actuated so as to move the valve rotor between the first and second positions. Any appropriate actuator may be used and use of actuators to actuate valves is well known in the art. Due to the fact that the way in which the valve rotor is actuated is not a key aspect of the present disclosure, and given that such technology is well known, further discussion of this point is omitted for the sake of brevity.

Figure 7:
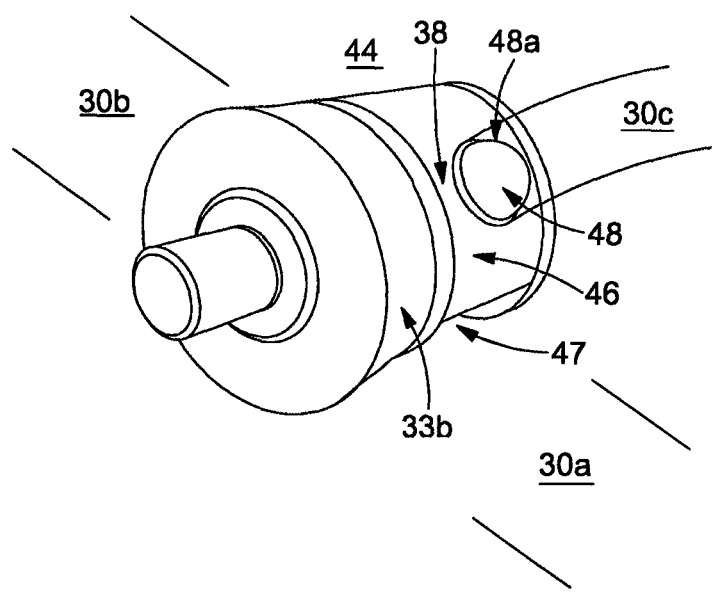
FIG. 7 shows a schematic view of a portion of a valve in accordance with another embodiment of the disclosure.

FIG. 7 shows a further embodiment of the present disclosure which includes an alternative valve rotor 33b. The seal portion 38 of rotor 33b comprises a rotor seal feature 48 which is sized and shaped to cooperate with the bypass port 30c to plug the bypass port when the valve rotor 33b is in the second position (i.e. the position in which the valve rotor blocks the bypass port). In particular, the rotor seal feature 48 comprises a raised sealing face which has a shape corresponding to that of an opening 48a of the bypass port. The opening of the bypass port may be where the bypass port opens onto the valve chamber 31. When the valve rotor is in the second position the sealing face is received by the bypass port so as to plug the bypass port. It will be appreciated that in other embodiments, should the geometry of the bypass port opening differ, the geometry of the rotor seal feature/ceiling face would be chosen so as to correspond to that of the bypass port opening.

In some embodiments the valve rotor 33a and/or housing 44 which defines the valve chamber 31 may include an abradable material.

For example, in some embodiments, a portion of a wall defining the valve chamber (i.e. a wall of the housing 44) may include an abradable material. Referring to FIG. 4, the portions of the wall of the housing 44 defining the valve chamber which include an abradable material are indicated in dashed lines by the reference numeral 50.

It will be appreciated that, given that the radial separation between the valve rotor and the bypass port decreases to a minimum when the valve rotor is in the second position, when the valve rotor is in the second position, the valve rotor contacts the abradable material 50 to form a seal therewith.

The abradable material 50 is located adjacent a bypass port 30c such that the seal made between the abradable material 50 and the valve rotor 33a helps to seal the bypass port 30c when the valve rotor 33a is in the second position. Furthermore, the ability of the abradable material to reduce leakage into the bypass port 30c as opposed to the exhaust gas passing to the output port 30a is particularly increased when the abradable material 50 is located between the bypass port and the outlet port (as is the case with the portion of abradable material 50 located on the right within FIG. 4).

In the present embodiment the wall of the valve chamber includes a first region of abradable material 50 located on a first side of the bypass port 30c and a second region of abradable material located on a second side of the bypass port 30c. This arrangement assists in ensuring the bypass port 30c is adequately sealed.

In some embodiments the valve rotor 33a may include an abradable material shown in thick black line within FIG. 4 and given the reference numeral 52. The abradable material 52 contacts a wall of the valve chamber 31 when the valve rotor 33a is in the second position.

It should be noted that, although the wall of the valve chamber and valve rotor contact one another in the second position as shown in FIG. 4, FIG. 4 maintains a gap between the wall of the valve chamber 31 and valve rotor 33a for the sake of clarity of the figure.

Within the embodiment shown in FIG. 4, it is the seal portion 38 of the valve rotor 33a which includes said abradable material 52.

Despite the fact that the abradable material 52 may be said to be continuous as shown in FIG. 4 (in other embodiments there may be separate discrete portions of abradable material), it is still the case that the valve rotor 33a comprises two separate regions of abradable material 50. In particular, a first region of abradable material (located on the left in FIG. 4) is located on a first side of the bypass port 30c when the valve rotor is in the second position, and a second region of abradable material (located on the right in FIG. 4) is located on a second side of the bypass port 30c when the valve rotor 33a is in the second position. The benefit of having abradable material on either side of the bypass port is the same as that discussed above in relation to the abradable material on the wall of the valve chamber—namely, that it assists in providing an effective seal around the bypass port 30c.

The benefit of each of the embodiments which includes a portion of abradable material to form a seal is that, although the seal is formed by contact between the valve rotor and the wall of the valve chamber, because such contact is between at least one surface which includes an abradable material, any tendency for the parts to stick or jam when they contact one another is reduced. This is particularly advantageous when the temperatures which the valve is exposed to may cause substantial expansion of some parts of the valve. The reason that the abradable material assists in preventing sticking or jamming is that if the valve rotor and wall contact each other to an extent that sticking or jamming may occur, the abradable material will abrade so as to prevent sticking or jamming.

Any suitable abradable material may be used provided it abradable by the movement concerned and provided it is suitable for operating in the environment (e.g. temperature) in which it is located. Examples of suitable abradable material include, depending on temperature in service, any of the proprietary Ytterbia Zirconate based ceramic abradable powders, Aluminum Bronze/Polyester abradable powders (e.g. Metco 601), Nickel—5% Aluminum thermal spray powders (e.g. Metco 450), CoNiCrAlY-BN/Polyester abradable thermal spray powders and Nickel Chromium Alloy/Boron Nitride thermal spray powders. At least some of these materials are supplied by Oerlikon Metco (see https://www.oerlikon.com/metco/en/products-services/coating-materiais/coating-materials-thermal-spray/abradables-polymer-fillers/). Further examples of suitable material may be found with reference to the coatings described in U.S. Pat. Nos. 5,185,217 and 5,975,845, the relevant portions of both of which are incorporated by reference.

According to another aspect of the disclosure, there is provided a rotary turbine bypass valve comprising, as shown in FIG. 3, a valve chamber 31 positioned at a junction of an inlet port 30b an outlet port 30a, and a bypass port 30c. The inlet port 30b is configured for fluid communication with a flow of exhaust gas from an engine, the outlet port 30a is configured for fluid communication with an inlet at the turbine, and the bypass port 30c is configured for fluid communication with an exhaust after-treatment device.

The valve 30 also includes a valve rotor supported for rotation, about a valve axis 37 within the valve chamber 31. The valve rotor is rotatable about the valve axis 37 between a first position in which the valve rotor permits gas flow through the bypass port, and a second position in which the valve rotor blocks gas flow through the bypass port.

Figure 8:
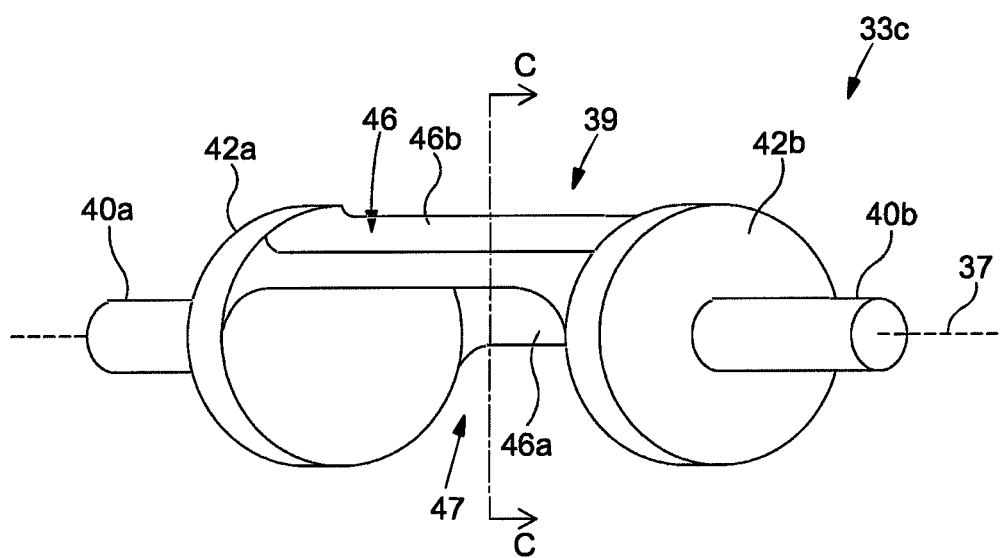
FIG. 8 shows a schematic view of a valve rotor in accordance with a further embodiment of the disclosure.
Figure 9:
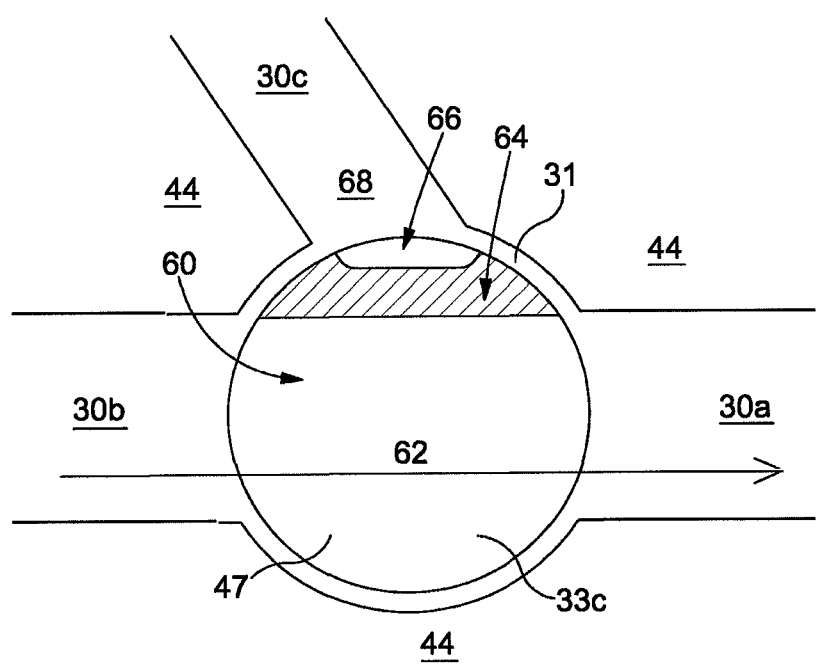
FIG. 9 shows a schematic cross-sectional view through the valve rotor of FIG. 8 in situ within a valve.

So far, the valve according to this aspect of the present disclosure is the same as the known type of valve shown in FIG. 3. However, this aspect of the present disclosure includes a valve rotor 33c, shown in FIGS. 8 and 9, which replaces the valve rotor 33 shown in FIG. 3. FIG. 8 shows a schematic perspective view of valve rotor 33c, whereas FIG. 9 shows a schematic cross-sectional view through the valve rotor of FIG. 8 (denoted by C) in situ within a valve. The features of the valve rotor 33c shown in FIGS. 8 and 9 are discussed in more detail below.

The valve rotor 33c comprises a first portion 60 within the valve chamber 31 which defines at least part of a flow passage 62 between the inlet port 30b and the outlet port 30a when the rotor is in the second position. The valve rotor 33c further comprises a second portion 64 of the valve rotor 33c located within the valve chamber 31. The second portion 64 is separate to the first portion 60. The second portion 64 comprises a recess or cutaway 66.

When the valve rotor 33c is in the second position (as shown in FIG. 9), the valve rotor 33c and the bypass port 30c define a bypass chamber 68, the recess or cutaway 66 being located in the bypass chamber 68.

The valve rotor 33c comprises a second recess 47, said second recess 47 defining at least a portion of said flow passage 62 between the inlet port 30b and outlet port 30a when the valve rotor 33c is in the second position.

It may be said that the rotor sector or rotor portion that forms the seal which blocks the bypass port (in the second position) is cutaway or includes a recess 66 in the region of said rotor sector which is opposite to the face of the valve rotor which in contact with the bulk gas flow (i.e. which forms part of a flow passage 62 between the inlet port 30b and the outlet port 30a when the rotor is in the second position).

The cutaway 66 has the effect of reducing the mass and hence thermal inertia of the valve rotor 33c. This in turn means that any thermal expansion of the valve rotor during transients (i.e. changes in temperature of the valve rotor resulting from a change in the temperature of the gas to which the valve is exposed) is more uniform. The increased uniformity of the thermal expansion of the valve rotor 33c means that the valve rotor undergoing thermal expansion is less likely to foul against the wall which defines the valve chamber, and hence less likely to stick or jam as it is being rotated in order to actuate the valve. Reducing the likelihood of the valve rotor sticking or jamming reduces the likelihood that the valve will fail and enhances performance of the valve because it makes accurate positioning of the valve rotor more straightforward.

It should be appreciated that two separate aspects of the disclosure have been described, which may separately solve the same problem—reducing valve sticking and jamming. The first aspect relates to an eccentric valve rotor, whereas the second aspect relates to a cutaway in the rotor portion that forms the seal which blocks the bypass port. The disclosure applies to each of these disclosures separately and to a combination of the two (e.g. an eccentric valve rotor including a cutaway in the rotor portion that forms the seal which blocks the bypass port). The aspects of the disclosure may also improve sealing of the valve. For example, having an eccentric valve rotor may assist in urging the seal portion of the valve rotor against the bypass port so as to seal it. As a further example, the cutaway in the rotor portion that forms the seal which blocks the bypass port may mitigate the effects of any expansion of the rotor and/or valve housing which result in reduced sealing efficacy between the valve rotor and the bypass port.

It will be appreciated that many modifications to the described embodiment are possible which still fall within the scope of the disclosure as defined by the claims.

The invention claimed is:

1. A rotary turbine bypass valve comprising:
    a valve chamber positioned at a junction of an inlet port, an outlet port and a bypass port, the inlet port configured for fluid communication with a flow of exhaust gas from an engine, the outlet port configured for fluid communication with an inlet of a turbine, and the bypass port configured for fluid communication with an exhaust aftertreatment device; and
    a valve rotor supported for rotation, about a valve axis, within the valve chamber;
    wherein the valve rotor is rotatable about the valve axis between a first position in which the valve rotor permits gas flow through the bypass port and a second position in which the valve rotor blocks gas flow through the bypass port;
    wherein the valve rotor is eccentric such that it includes a seal portion which is a portion of the valve rotor within the valve chamber which is furthest radially spaced from the valve axis; and as the valve rotor moves from the first position to the second position the seal portion moves towards the bypass port such that the radial separation between the valve rotor and the bypass port decreases to a minimum when the valve rotor is in the second position in which the seal portion is adjacent the bypass port;

wherein the seal portion comprises a rotor seal feature sized and shaped to cooperate with the bypass port to plug the bypass port when the valve rotor is in the second position; and wherein the rotor seal feature comprises a raised sealing face which has a shape corresponding to that of an opening of the bypass port, the raised sealing face plugging the bypass port when the valve rotor is in the second position.

2. A valve according to claim 1, wherein the valve chamber is defined by a housing, and the valve rotor comprises at least one spindle, the or each spindle being supported by the housing such that the or each spindle lies along the valve axis, and such that the valve rotor is rotatable relative to the housing about the or each spindle.

3. A valve according to claim 1, wherein the valve rotor comprises a recess, said recess defining at least a portion of a flow passage between the inlet port and outlet port when the valve rotor is in the second, position.

4. A valve according to claim 1, wherein the turbine forms part of a turbocharger.

5. A valve according to claim 1 wherein a portion of a wall defining the valve chamber includes an abradable material, such that, when the valve rotor is in the second position, the valve rotor contacts the abradable material to form a seal therewith.

6. A valve according to claim 5 wherein the abradable material is located adjacent the bypass port.

7. A valve according to either claim 5, wherein the abradable material is located between the bypass port and the outlet port.

8. A valve according to claim 1, wherein the valve rotor comprises an abradable material which contacts a wall of the valve chamber when the valve rotor is in the second position to form a seal.

9. A valve according to claim 8, wherein the seal portion of the valve rotor comprises said abradable material of the valve rotor.

10. A valve according to claim 8, wherein the valve rotor comprises two separate regions of abradable material, a first region of abradable material located on a first side of the bypass port when the valve rotor is in the second position, and a second region located on a second side of the bypass port when the valve rotor is in the second position.

11. An engine arrangement comprising an engine, a turbine and a valve according to claim 1.

* * * * *